United States Patent
Kitagawa et al.

(10) Patent No.: US 10,107,946 B2
(45) Date of Patent: Oct. 23, 2018

(54) POLARIZING PLATE WITH A RETARDATION LAYER AND IMAGE DISPLAY APPARATUS

(71) Applicant: NITTO DENKO CORPORATION, Ibaraki-shi, Osaka (JP)

(72) Inventors: Takeharu Kitagawa, Ibaraki (JP); Tadashi Kojima, Ibaraki (JP); Hiroshi Sumimura, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 77 days.

(21) Appl. No.: 15/206,764

(22) Filed: Jul. 11, 2016

(65) Prior Publication Data
US 2017/0023716 A1    Jan. 26, 2017

(30) Foreign Application Priority Data

Jul. 22, 2015 (JP) .................................. 2015-144885
Sep. 11, 2015 (JP) .................................. 2015-179934
Oct. 13, 2015 (JP) .................................. 2015-201913

(51) Int. Cl.
G02B 5/30    (2006.01)
G02B 1/14    (2015.01)

(52) U.S. Cl.
CPC ............. *G02B 5/3016* (2013.01); *G02B 1/14* (2015.01); *G02B 5/305* (2013.01); *G02B 5/3083* (2013.01)

(58) Field of Classification Search
None
See application file for complete search history.

(56) References Cited

U.S. PATENT DOCUMENTS 6,565,974 B1    5/2003    Uchiyama et al.
6,829,026 B2    12/2004   Sasaki et al.
(Continued)

FOREIGN PATENT DOCUMENTS

CN    104571677 A    4/2015
JP    3325560 B2     9/2002
(Continued)

OTHER PUBLICATIONS

Office Action dated Mar. 27, 2017, issued in counterpart Taiwanese Application No. 105120605, with English translation. (6 pages).
(Continued)

*Primary Examiner* — Ryan Crockett
(74) *Attorney, Agent, or Firm* — Westerman, Hattori, Daniels & Adrian, LLP

(57) ABSTRACT

There is provided a thin polarizing plate with a retardation layer excellent in reworkability. A polarizing plate with a retardation layer according to the present invention includes: a polarizing plate including a polarizer and a protective layer on at least one side of the polarizer; a retardation layer; a first adhesive layer configured to bond the polarizing plate and the retardation layer; and a second adhesive layer arranged as an outermost layer on an opposite side of the retardation layer to the polarizing plate. An average linear expansion coefficient of the second adhesive layer when an ambient temperature is changed from $-150°$ C. to $20°$ C. is $38.0(\times 10^{-5}/°$ C.) or more, and is larger than an average linear expansion coefficient of the first adhesive layer when an ambient temperature is changed from $-150°$ C. to $20°$ C.

8 Claims, 2 Drawing Sheets

(56) References Cited

U.S. PATENT DOCUMENTS

| | | | |
|---|---|---|---|
| RE39,753 E | 7/2007 | Uchiyama et al. | |
| 7,528,915 B2 | 5/2009 | Choi et al. | |
| 8,274,624 B2 | 9/2012 | Kitagawa et al. | |
| 8,976,448 B1 | 3/2015 | Kitagawa et al. | |
| 9,039,861 B2 | 5/2015 | Yasui et al. | |
| 9,169,423 B2 | 10/2015 | Yasui et al. | |
| 2003/0086033 A1 | 5/2003 | Sasaki et al. | |
| 2006/0013967 A1* | 1/2006 | Mikoshiba | G02F 1/13338 428/1.1 |
| 2006/0098452 A1 | 5/2006 | Choi et al. | |
| 2007/0172604 A1* | 7/2007 | Sugiyama | G02B 5/30 428/1.3 |
| 2010/0039590 A1 | 2/2010 | Miyatake et al. | |
| 2010/0165264 A1* | 7/2010 | Kitagawa | G02F 1/133528 349/96 |
| 2012/0170245 A1 | 7/2012 | Hwang et al. | |
| 2012/0320316 A1* | 12/2012 | Yanai | G02B 5/3033 349/96 |
| 2013/0160938 A1 | 6/2013 | Yasui et al. | |
| 2013/0216805 A1 | 8/2013 | Yasui et al. | |
| 2014/0130955 A1 | 5/2014 | Yasui et al. | |
| 2015/0070761 A1* | 3/2015 | Kitagawa | G02B 5/3025 359/483.01 |
| 2016/0085006 A1* | 3/2016 | Akizuki | G02B 5/305 428/216 |

FOREIGN PATENT DOCUMENTS

| | | |
|---|---|---|
| JP | 2004-198614 A | 7/2004 |
| JP | 2006-099018 A | 4/2006 |
| JP | 2007-279383 A | 10/2007 |
| JP | 2011-33970 A | 2/2011 |
| JP | 2012-133308 A | 7/2012 |
| JP | 2013-101330 A | 5/2013 |
| JP | 2014-206732 A | 10/2014 |
| JP | 2015-55705 A | 3/2015 |
| KR | 2003-0030936 A | 4/2003 |
| KR | 10-2010-0031602 A | 3/2010 |
| TW | 200634404 A | 10/2006 |
| TW | 200907510 A | 2/2009 |
| WO | 2013/118641 A1 | 8/2013 |

OTHER PUBLICATIONS

Office Action dated Aug. 23, 2017, issued in counterpart Japanese Application No. 2015-201913, with English machine translation. (10 pages).

Office Action dated Jun. 21, 2017, issued in counterpart Korean application No. 10-2016-0092084, with English Translation. (13 pages).

Notice of Allowance dated Dec. 13, 2017 issued in corresponding Korean Application No. 10-2016-0092084.

Office Action dated Jan. 10, 2018, issued in corresponding Japanese Patent Application No. 2015-201913 with translation.

Office Action dated Apr. 20, 2018, issued in Chinese Patent Application No. 201610561023.9 with English translation.

* cited by examiner

POLARIZING PLATE WITH A RETARDATION LAYER AND IMAGE DISPLAY APPARATUS

This application claims priority under 35 U.S.C. Section 119 to Japanese Patent Application Nos. 2015-144885, 2015-179934 and 2015-201913 respectively filed on Jul. 22, Sep. 11 and Oct. 13, 2015, which are herein incorporated by reference.

BACKGROUND OF THE INVENTION

1. Field of the Invention

The present invention relates to a polarizing plate with a retardation layer and an image display apparatus using the same.

2. Description of the Related Art

In recent years, image display apparatus typified by a liquid crystal display apparatus and an organic EL display apparatus have been rapidly gaining more widespread use. In the image display apparatus, a polarizing plate and a retardation plate are typically used. In practical use, a polarizing plate with a retardation layer, in which the polarizing plate and the retardation plate are integrated, is widely used (for example, Japanese Patent No. 3325560). In this connection, recently, along with an increasing demand for thinning of the image display apparatus, there has also been an increasing demand for thinning of the polarizing plate with a retardation layer.

Incidentally, for the purposes of, for example, preventing a variation in quality and/or streamlining image display apparatus assembly, the polarizing plate with a retardation layer is typically bonded onto a liquid crystal cell or an organic EL cell (hereinafter collectively referred to as "display cell") under a state in which an adhesive layer formed of a pressure-sensitive adhesive or an adhesive is arranged in advance. In this case, when foreign matter, such as a contaminant or an air bubble, is incorporated at the time of bonding onto the display cell, the portion into which the foreign matter has been incorporated hinders viewing. Accordingly, the polarizing plate with a retardation layer in which the foreign matter has been incorporated is peeled and removed from the display cell, and the display cell is reused. Such operation in image display apparatus assembly is called rework.

In recent years, the rework has been performed using liquid nitrogen in some cases. In the case where the polarizing plate has a large thickness, even when the display cell and the polarizing plate with a retardation layer cannot be peeled from each other through the rework with liquid nitrogen, no problem arises because the rework can be manually performed. Meanwhile, in the case where the polarizing plate has a small thickness, an attempt to manually perform the rework often results in a failure to peel off the polarizing plate with a retardation layer owing to its breakage. Accordingly, there is a demand for a thin polarizing plate with a retardation layer which can be satisfactorily peeled from a display cell through the rework with liquid nitrogen.

SUMMARY OF THE INVENTION

The present invention has been made in order to solve the problem as described above, and a primary object of the present invention is to provide a thin polarizing plate with a retardation layer excellent in reworkability.

A polarizing plate with a retardation layer according to the present invention includes: a polarizing plate including a polarizer and a protective layer on at least one side of the polarizer; a retardation layer; a first adhesive layer configured to bond the polarizing plate and the retardation layer; and a second adhesive layer arranged as an outermost layer on an opposite side of the retardation layer to the polarizing plate. An average linear expansion coefficient of the second adhesive layer when an ambient temperature is changed from $-150°$ C. to $20°$ C. is 38.0 ($\times 10^{-5}/°$ C.) or more, and is larger than an average linear expansion coefficient of the first adhesive layer when an ambient temperature is changed from $-150°$ C. to $20°$ C.

In one embodiment of the present invention, the polarizing plate with a retardation layer has a total thickness of layers except for the second adhesive layer of 140 μm or less.

In one embodiment of the present invention, the retardation layer includes a polycarbonate-based resin film.

In one embodiment of the present invention, the polarizing plate with a retardation layer further includes another retardation layer on an outside of the retardation layer.

In one embodiment of the present invention, the retardation layer includes an alignment fixed layer of a liquid crystal compound. In one embodiment of the present invention, the retardation layer has a laminated structure of: a first alignment fixed layer of a liquid crystal compound; and a second alignment fixed layer of a liquid crystal compound.

In one embodiment of the present invention, the polarizing plate with a retardation layer further includes one of a conductive layer and an isotropic base material with a conductive layer on an outside of the retardation layer.

According to another aspect of the present invention, an image display apparatus is provided. The image display apparatus includes the polarizing plate with a retardation layer as described above.

According to the present invention, in the thin polarizing plate with a retardation layer, the average linear expansion coefficient of the first adhesive layer configured to bond the polarizing plate and the retardation layer in the specific temperature range is optimized, and the relationship between the average linear expansion coefficient of the first adhesive layer and the average linear expansion coefficient of the second adhesive layer arranged as the outermost layer for bonding onto a display cell in the specific temperature range is optimized. Thus, the occurrence of a problem (typically remaining of the retardation layer peeled from the polarizing plate on the display cell) in rework (in particular, rework at low temperature involving using liquid nitrogen) can be remarkably suppressed.

DETAILED DESCRIPTION OF THE PREFERRED EMBODIMENTS

Now, embodiments of the present invention are described. However, the present invention is not limited to these embodiments.

Definitions of Terms and Symbols

The definitions of terms and symbols used herein are as follows.
(1) Refractive Indices (nx, ny, and nz)

A symbol "nx" represents a refractive index in a direction in which an in-plane refractive index is maximum (that is, slow axis direction), "ny" represents a refractive index in a direction perpendicular to the slow axis in the plane (that is, fast axis direction), and "nz" represents a refractive index in a thickness direction.
(2) In-Plane Retardation (Re)

The term "Re($\lambda$)" refers to the in-plane retardation of a film measured at 23° C. with light having a wavelength of $\lambda$ nm. For example, the term "Re(550)" refers to the in-plane retardation of the film measured at 23° C. with light having a wavelength of 550 nm. The Re($\lambda$) is determined from the equation "Re=(nx−ny)×d" when the thickness of the film is represented by d (nm).
(3) Thickness Direction Retardation (Rth)

The term "Rth($\lambda$)" refers to the thickness direction retardation of the film measured at 23° C. with light having a wavelength of $\lambda$ nm. For example, the term "Rth(550)" refers to the thickness direction retardation of the film measured at 23° C. with light having a wavelength of 550 nm. The Rth($\lambda$) is determined from the equation "Rth=(nx−nz)×d" when the thickness of the film is represented by d (nm).
(4) Nz Coefficient An Nz coefficient is determined from the equation "Nz=Rth/Re".

A. Overall Configuration of Polarizing Plate with a Retardation Layer

Figure 1:
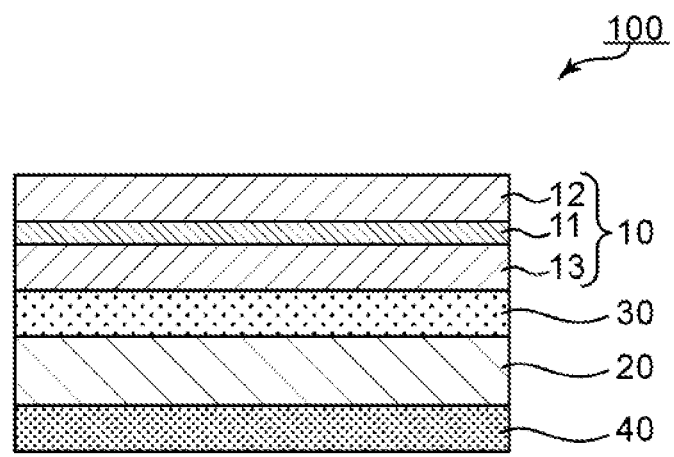
FIG. 1 is a schematic sectional view of a polarizing plate with a retardation layer according to one embodiment of the present invention.

FIG. 1 is a schematic sectional view of a polarizing plate with a retardation layer according to one embodiment of the present invention. A polarizing plate 100 with a retardation layer according to this embodiment includes a polarizing plate 10, a retardation layer 20, a first adhesive layer 30 configured to bond the polarizing plate 10 and the retardation layer 20, and a second adhesive layer 40 arranged as an outermost layer on the opposite side of the retardation layer 20 to the polarizing plate 10. The second adhesive layer 40 is configured to bond the polarizing plate with a retardation layer and a display cell of an image display apparatus (such as a liquid crystal cell or an organic EL cell). The polarizing plate 10 includes a polarizer 11, a first protective layer 12 arranged on one side of the polarizer 11, and a second protective layer 13 arranged on the other side of the polarizer 11. One of the first protective layer 12 and the second protective layer 13 may be omitted depending on purposes. For example, when the retardation layer 20 can also function as a protective layer for the polarizer 11, the second protective layer 13 may be omitted.

Figure 2:
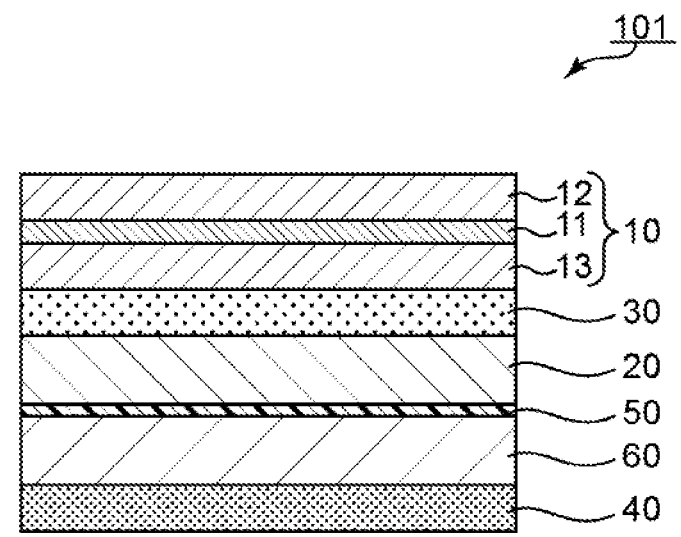
FIG. 2 is a schematic sectional view of a polarizing plate with a retardation layer according to another embodiment of the present invention.

As illustrated in FIG. 2, in a polarizing plate 101 with a retardation layer according to another embodiment, another retardation layer 50, and/or a conductive layer or an isotropic base material 60 with a conductive layer may be arranged. The other retardation layer 50, and the conductive layer or the isotropic base material 60 with a conductive layer are typically arranged on the outside of the retardation layer 20 (opposite side to the polarizing plate 10). The other retardation layer 50, and the conductive layer or the isotropic base material 60 with a conductive layer are typically arranged in the stated order from the retardation layer 20 side. The other retardation layer 50, and the conductive layer or the isotropic base material 60 with a conductive layer are typically optional layers to be arranged as required, and any one or both thereof may be omitted. For convenience, the retardation layer 20 is sometimes referred to as "first retardation layer" and the other retardation layer 50 is sometimes referred to as "second retardation layer." When the conductive layer or the isotropic base material with a conductive layer is arranged, the polarizing plate with a retardation layer may be applied to a so-called inner touch panel-type input display apparatus, which includes a built-in touch sensor between a display cell (such as an organic EL cell) and a polarizing plate.

Figure 3:
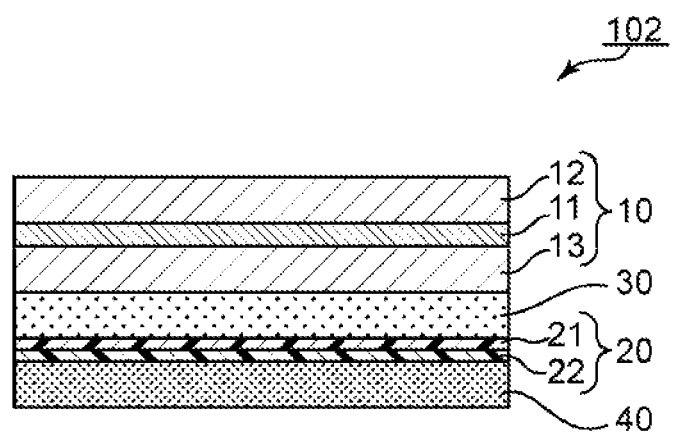
FIG. 3 is a schematic sectional view of a polarizing plate with a retardation layer according to still another embodiment of the present invention.

In one embodiment, the first retardation layer 20 is constituted of a resin film. In another embodiment, the first retardation layer 20 may be an alignment fixed layer of a liquid crystal compound. In the latter embodiment, the first retardation layer 20 may be a single layer, or may have a laminated structure of a first alignment fixed layer 21 and a second alignment fixed layer 22 as illustrated in FIG. 3. The resin film and the alignment fixed layer of a liquid crystal compound are described in detail in the section C-2 and the section C-3, respectively.

The above-mentioned embodiments may be combined as appropriate, and modifications obvious in the art may be made to the constituent elements in the above-mentioned embodiments. For example, in a polarizing plate 102 with a retardation layer of FIG. 3, the second retardation layer 50, and/or the conductive layer or the isotropic base material 60 with a conductive layer may be arranged. In addition, for example, the configuration of arranging the isotropic base material 60 with a conductive layer on the outside of the second retardation layer 50 may be replaced with an optically equivalent configuration (such as a laminate of the second retardation layer and a conductive layer).

In an embodiment of the present invention, the average linear expansion coefficient of the second adhesive layer 40 when an ambient temperature is changed from −150° C. to 20° C. (hereinafter sometimes referred to simply as "average linear expansion coefficient") is 38.0(×10$^{-5}$/° C.) or more, preferably 39.0(×10$^{-5}$/° C.) or more, more preferably 40.0 (×10$^{-5}$/° C.) or more. The upper limit of the average linear expansion coefficient of the second adhesive layer is, for example, 200(×10$^{-5}$/° C.). When the average linear expansion coefficient of the second adhesive layer falls within such range, the polarizing plate with a retardation layer can be satisfactorily peeled from a display cell in rework (in particular, rework at low temperature involving using liquid nitrogen). Further, the average linear expansion coefficient of the second adhesive layer is larger than the average linear expansion coefficient of the first adhesive layer. When the average linear expansion coefficients are set as described above, in the rework (in particular, rework at low temperature involving using liquid nitrogen), peeling between the polarizing plate 10 and the first retardation layer 20 can be satisfactorily prevented, and the display cell and the polarizing plate with a retardation layer are satisfactorily peeled from each other, and hence the occurrence of a problem (typically remaining of the retardation layer peeled from the polarizing plate on the display cell) in the rework can be remarkably suppressed. The difference between the average linear expansion coefficient of the first adhesive layer and the average linear expansion coefficient of the second adhesive layer is preferably 1.5($\times 10^{-5}$/° C.) or more, more preferably from 2.0($\times 10^{-5}$/° C.) to 4.0($\times 10^{-5}$/° C.). When the difference between the average linear expansion coefficients falls within such range, the problem in the rework (in particular, rework at low temperature involving using liquid nitrogen) can be more remarkably suppressed. The average linear expansion coefficients may be determined by TMA measurement in conformity to JIS K 7197.

The total thickness of the polarizing plate with a retardation layer is preferably 140 µm or less, more preferably from 50 µm to 135 µm, still more preferably from 55 µm to 80 µm. When a polarizing plate with a retardation layer has an extremely small thickness, the occurrence of a problem in rework (in particular, rework at low temperature involving using liquid nitrogen) is remarkable. According to the present invention, however, even when the thickness of the polarizing plate with a retardation layer is extremely small as described above, the occurrence of the problem can be extremely satisfactorily suppressed. The total thickness of the polarizing plate with a retardation layer refers to the total thickness of all the constituent layers of the polarizing plate with a retardation layer except for the second adhesive layer 40.

Now, the constituent layers of the polarizing plate with a retardation layer, an optical film, and an adhesive and a pressure-sensitive adhesive are described in more detail.

B. Polarizing Plate

B-1. Polarizer

Any appropriate polarizer may be adopted as the polarizer 11. For example, a resin film for forming the polarizer may be a single-layer resin film, or may be a laminate of two or more layers.

Specific examples of the polarizer constituted of a single-layer resin film include: a product obtained by subjecting a hydrophilic polymer film such as a polyvinyl alcohol-based film, a partially formalized polyvinyl alcohol-based film, or an ethylene-vinyl acetate copolymer-based partially saponified film to dyeing treatment with a dichromatic substance such as iodine or a dichromatic dye and stretching treatment; and a polyene-based alignment film such as a dehydration-treated product of polyvinyl alcohol or a dehydrochlorination-treated product of polyvinyl chloride. Of those, a polarizer obtained by dyeing a polyvinyl alcohol-based film with iodine and uniaxially stretching the resultant is preferably used because of its excellent optical characteristics.

The dyeing with iodine is performed by, for example, immersing the polyvinyl alcohol-based film in an aqueous solution of iodine. The stretching ratio of the uniaxial stretching is preferably from 3 to 7 times. The stretching may be performed after the dyeing treatment or may be performed simultaneously with the dyeing. In addition, the stretching may be performed before the dyeing. The polyvinyl alcohol-based film is subjected to, for example, swelling treatment, cross-linking treatment, washing treatment, or drying treatment as required. For example, when the polyvinyl alcohol-based film is washed with water by being immersed in water before the dyeing, the soil or antiblocking agent on the surface of the polyvinyl alcohol-based film can be washed off. In addition, the polyvinyl alcohol-based film can be swollen to prevent dyeing unevenness or the like.

The polarizer obtained by using the laminate is, for example, a polarizer obtained by using a laminate of a resin base material and a PVA-based resin layer (PVA-based resin film) laminated on the resin base material, or a laminate of a resin base material and a PVA-based resin layer formed on the resin base material through application. The polarizer obtained by using the laminate of the resin base material and the PVA-based resin layer formed on the resin base material through application may be produced by, for example, a method involving: applying a PVA-based resin solution onto the resin base material; drying the solution to form the PVA-based resin layer on the resin base material, thereby providing the laminate of the resin base material and the PVA-based resin layer; and stretching and dyeing the laminate to turn the PVA-based resin layer into the polarizer. In this embodiment, the stretching typically includes the stretching of the laminate under a state in which the laminate is immersed in an aqueous solution of boric acid. The stretching may further include the in-air stretching of the laminate at high temperature (e.g., 95° C. or more) before the stretching in the aqueous solution of boric acid as required. The resultant laminate of the resin base material and the polarizer may be used as it is (i.e., the resin base material may be used as a protective layer for the polarizer). Alternatively, a product obtained as described below may be used: the resin base material is peeled from the laminate of the resin base material and the polarizer, and any appropriate protective layer in accordance with purposes is laminated on the peeled surface. Details of such method of producing a polarizer are disclosed in, for example, Japanese Patent Application Laid-open No. 2012-73580. The entire disclosure of the laid-open publication is incorporated herein by reference.

The thickness of the polarizer is preferably 15 µm or less, more preferably from 1 µm to 12 µm, still more preferably from 3 µm to 12 µm, particularly preferably from 3 µm to 8 µm. According to the present invention, even when the polarizer (consequently the polarizing plate with a retardation layer) is extremely thin, the occurrence of a problem in rework (in particular, rework at low temperature involving using liquid nitrogen) can be remarkably suppressed. In addition, when the thickness of the polarizer falls within such range, curling at the time of heating can be satisfactorily suppressed, and satisfactory external appearance durability at the time of heating is obtained.

The boric acid content of the polarizer is preferably 18 wt % or more, more preferably from 18 wt % to 25 wt %. When the boric acid content of the polarizer falls within such range, by virtue of a synergetic effect with its iodine content to be described later, while the ease of curling adjustment at the time of bonding is satisfactorily maintained and curling at the time of heating is satisfactorily suppressed, external appearance durability at the time of heating can be improved. The boric acid content may be calculated, for example, as the amount of boric acid contained per unit weight of the polarizer through the use of the following expression on the basis of a neutralization method.

[Amount of NaOH aqueous solution dropped (mL)×Concentration of NaOH aqueous solution (mol/L)×$10^{-3}$/Weight of polarizer (g)]×Molecular weight of boric acid (g/mol)×100

The iodine content of the polarizer is preferably 2.1 wt % or more, more preferably from 2.1 wt % to 3.5 wt %. When the iodine content of the polarizer falls within such range, by virtue of the synergetic effect with the boric acid content, while the ease of curling adjustment at the time of bonding is satisfactorily maintained and curling at the time of heating is satisfactorily suppressed, external appearance durability at the time of heating can be improved. The term "iodine content" as used herein means the amount of all iodine contained in the polarizer (PVA-based resin film). More specifically, in the polarizer, iodine is present in the forms of an iodide ion ($I^-$), an iodine molecule ($I_2$), polyiodide ions ($I_3^-$ and $I_5^-$), and the like, and the term "iodine content" as used herein means the amount of iodine encompassing all of those forms. The iodine content may be calculated by, for example, a calibration curve method for X-ray fluorescence analysis. The polyiodide ions are each present in a state of forming a PVA-iodine complex in the polarizer. Through the formation of such complex, absorption dichroism can be expressed in the wavelength range of visible light. Specifically, a complex of PVA and a triiodide ion ($PVA.I_3^-$) has an absorption peak around 470 nm, and a complex of PVA and a pentaiodide ion ($PVA.I_5^-$) has an absorption peak around 600 nm. As a result, the polyiodide ions can absorb light in a wide range of visible light depending on their forms. Meanwhile, the iodide ion ($I^-$) has an absorption peak around 230 nm, and is not substantially involved in the absorption of visible light. Therefore, the polyiodide ions each present in a state of a complex with PVA can be mainly involved in the absorption performance of the polarizer.

The polarizer preferably shows absorption dichroism at any wavelength in the wavelength range of from 380 nm to 780 nm. The single axis transmittance of the polarizer is preferably from 43.0% to 46.0%, more preferably from 44.5% to 46.0%. The polarization degree of the polarizer is preferably 97.0% or more, more preferably 99.0% or more, still more preferably 99.9% or more.

B-2. First Protective Layer

The first protective layer 12 is formed of any appropriate film that may be used as a protective layer for the polarizer. Specific examples of a material serving as a main component of the film include transparent resins such as a cellulose-based resin such as triacetylcellulose (TAC), a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth) acrylic resin, and an acetate-based resin. Another example thereof is a thermosetting resin or a UV-curable resin such as a (meth)acrylic resin, a urethane-based resin, a (meth) acrylic urethane-based resin, an epoxy-based resin, or a silicone-based resin. Still another example thereof is a glassy polymer such as a siloxane-based polymer. Further, a polymer film described in JP 2001-343529 A (WO 01/37007 A1) may also be used. As a material for the film, for example, there may be used a resin composition containing a thermoplastic resin having a substituted or unsubstituted imide group in a side chain and a thermoplastic resin having a substituted or unsubstituted phenyl group and a nitrile group in a side chain. An example thereof is a resin composition containing an alternate copolymer formed of isobutene and N-methylmaleimide and an acrylonitrile-styrene copolymer. The polymer film may be an extruded product of the resin composition, for example.

As described later, the polarizing plate with a retardation layer of the present invention is typically arranged on the viewer side of an image display apparatus, and the first protective layer 12 is typically arranged on its viewer side. Therefore, the first protective layer 12 may be subjected to surface treatment, such as hard coat treatment, antireflection treatment, anti-sticking treatment, or antiglare treatment, as required. Further/alternatively, the first protective layer 12 may be subjected to treatment for improving viewability in the case of viewing through the intermediation of polarized sunglasses (typically imparting a circular (elliptical) polarization function or imparting an ultra-high retardation) as required. When such treatment is performed, even in the case of viewing a display screen through the intermediation of a polarized lens, such as polarized sunglasses, excellent viewability can be realized. Therefore, the polarizing plate with a retardation layer can be suitably applied even to an image display apparatus which may be used outdoors.

Any appropriate thickness may be adopted as the thickness of the first protective layer as long as the above-mentioned desired thickness of the polarizing plate and a desired difference from the thickness of the second protective layer to be described later can be obtained. The thickness of the first protective layer is, for example, from 10 µm to 50 µm, preferably from 15 µm to 40 µm. When the surface treatment is performed, the thickness of the first protective layer is a thickness including the thickness of a surface treatment layer.

B-3. Second Protective Layer

The second protective layer 13 is also formed of any appropriate film which may be used as a protective layer for a polarizer. A material which serves as a main component of the film is as described in the section B-2 regarding the first protective layer. It is preferred that the second protective layer 13 be optically isotropic. The phrase "be optically isotropic" as used herein refers to having an in-plane retardation Re(550) of from 0 nm to 10 nm and a thickness direction retardation Rth(550) of from −10 nm to +10 nm.

The thickness of the second protective layer is, for example, from 15 µm to 35 µm, preferably from 20 µm to 30 µm. The difference between the thickness of the first protective layer and the thickness of the second protective layer is preferably 15 µm or less, more preferably 10 µm or less. When the difference between the thicknesses falls within such range, curling at the time of bonding can be satisfactorily suppressed. The thickness of the first protective layer and the thickness of the second protective layer may be equal to each other, the first protective layer may be thicker, or the second protective layer may be thicker. The first protective layer is typically thicker than the second protective layer.

C. First Retardation Layer

C-1. Characteristics of First Retardation Layer

The first retardation layer 20 may have any appropriate optical characteristics and/or mechanical characteristics depending on purposes. The first retardation layer 20 typically has a slow axis. In one embodiment, an angle θ formed by the slow axis of the first retardation layer 20 and the absorption axis of the polarizer 11 is preferably from 38° to 52°, more preferably from 42° to 48°, still more preferably about 45°. When the angle θ falls within such range, through the use of the first retardation layer as a λ/4 plate as described later, a polarizing plate with a retardation layer having an extremely excellent circular polarization characteristic (consequently an extremely excellent antireflection characteristic) can be obtained.

The first retardation layer preferably has a refractive index characteristic of showing a relationship of nx>ny≥nz. The first retardation layer is typically arranged in order to impart an antireflection characteristic to the polarizing plate, and in one embodiment, may function as a λ/4 plate. In this case, the in-plane retardation Re(550) of the first retardation layer is preferably from 80 nm to 200 nm, more preferably from 100 nm to 180 nm, still more preferably from 110 nm to 170 nm. Herein, "ny=nz" encompasses not only the case where ny and nz are exactly equal to each other, but also the case where ny and nz are substantially equal to each other. Therefore, a relationship of ny<nz may be satisfied without impairing the effect of the present invention.

The Nz coefficient of the first retardation layer is preferably from 0.9 to 3, more preferably from 0.9 to 2.5, still more preferably from 0.9 to 1.5, particularly preferably from 0.9 to 1.3. When such relationship is satisfied, in the case of using the polarizing plate with a retardation layer to be obtained for an image display apparatus, an extremely excellent reflection hue can be achieved.

The first retardation layer may show a reverse wavelength dispersion characteristic, i.e., a retardation value increasing with an increase in wavelength of measurement light, may show a positive wavelength dispersion characteristic, i.e., a retardation value decreasing with an increase in wavelength of measurement light, or may show a flat wavelength dispersion characteristic, i.e., a retardation value hardly changing even when the wavelength of measurement light changes. In one embodiment, the first retardation layer shows the reverse wavelength dispersion characteristic. In this case, the ratio Re(450)/Re(550) of the retardation layer is preferably 0.8 or more and less than 1, more preferably 0.8 or more and 0.95 or less. With such configuration, an extremely excellent antireflection characteristic can be realized.

The first retardation layer contains a resin having an absolute value of its photoelastic coefficient of preferably $2\times10^{-11}$ m$^2$/N or less, more preferably from $2.0\times10^{-13}$ m$^2$/N to $1.5\times10^{-11}$ m$^2$/N, still more preferably from $1.0\times10^{-12}$ m$^2$/N to $1.2\times10^{-1}$ m$^2$/N. When the absolute value of the photoelastic coefficient falls within such range, a retardation change is less liable to be generated in the case where a shrinkage stress is generated at the time of heating. As a result, heat unevenness in an image display apparatus to be obtained can be satisfactorily prevented.

C-2. First Retardation Layer Constituted of Resin Film

When the first retardation layer is constituted of a resin film, the thickness of the first retardation layer is preferably 60 μm or less, preferably from 30 μm to 55 μm. When the thickness of the first retardation layer falls within such range, while curling at the time of heating is satisfactorily suppressed, curling at the time of bonding can be satisfactorily adjusted.

The first retardation layer 20 may be constituted of any appropriate resin film which can satisfy the characteristics described in the section C-1. Typical examples of such resin include a cyclic olefin-based resin, a polycarbonate-based resin, a cellulose-based resin, a polyester-based resin, a polyvinyl alcohol-based resin, a polyamide-based resin, a polyimide-based resin, a polyether-based resin, a polystyrene-based resin, and an acrylic resin. When the first retardation layer is constituted of a resin film showing the reverse wavelength dispersion characteristic, a polycarbonate-based resin may be suitably used.

As the polycarbonate resin, any appropriate polycarbonate resin may be used as long as the effect of the present invention is obtained. The polycarbonate resin preferably contains: a structural unit derived from a fluorene-based dihydroxy compound; a structural unit derived from an isosorbide-based dihydroxy compound; and a structural unit derived from at least one dihydroxy compound selected from the group consisting of an alicyclic diol, an alicyclic dimethanol, di-, tri-, or polyethylene glycol, and an alkylene glycol or spiroglycol. The polycarbonate resin more preferably contains: a structural unit derived from a fluorene-based dihydroxy compound; a structural unit derived from an isosorbide-based dihydroxy compound; and a structural unit derived from an alicyclic dimethanol and/or a structural unit derived from di-, tri-, or polyethylene glycol. The polycarbonate resin still more preferably contains: a structural unit derived from a fluorene-based dihydroxy compound; a structural unit derived from an isosorbide-based dihydroxy compound; and a structural unit derived from di-, tri-, or polyethylene glycol. The polycarbonate resin may contain a structural unit derived from any other dihydroxy compound as required. Details of the polycarbonate resin which may be suitably used in the present invention are disclosed in, for example, Japanese Patent Application Laid-open No. 2014-10291 and Japanese Patent Application Laid-open No. 2014-26266. The disclosures of the laid-open publications are incorporated herein by reference.

The glass transition temperature of the polycarbonate resin is preferably 110° C. or more and 150° C. or less, more preferably 120° C. or more and 140° C. or less. When the glass transition temperature is excessively low, the heat resistance of the resin tends to deteriorate and hence the resin may cause a dimensional change after its forming into a film. In addition, the image quality of a liquid crystal panel or an organic EL panel to be obtained may deteriorate. When the glass transition temperature is excessively high, the forming stability of the resin at the time of its forming into a film may deteriorate. In addition, the transparency of the film may be impaired. The glass transition temperature is determined in conformity to JIS K 7121 (1987).

The molecular weight of the polycarbonate resin may be expressed as a reduced viscosity. The reduced viscosity is measured with an Ubbelohde viscometer at a temperature of 20.0° C.±0.1° C. after precise adjustment of a polycarbonate concentration to 0.6 g/dL through the use of methylene chloride as a solvent. The lower limit of the reduced viscosity is generally preferably 0.30 dL/g, more preferably 0.35 dL/g or more. The upper limit of the reduced viscosity is generally preferably 1.20 dL/g, more preferably 1.00 dL/g, still more preferably 0.80 dL/g. When the reduced viscosity is lower than the lower limit value, there may arise a problem of a reduction in mechanical strength of a formed article. Meanwhile, when the reduced viscosity is higher than the upper limit value, there may arise a problem in that flowability during forming is decreased to decrease productivity and formability.

A commercially available film may be used as a polycarbonate-based resin film. Specific examples of the commercially available product include products available under the trade names "PURE-ACE WR-S", "PURE-ACE WR-W", and "PURE-ACE WR-M" from Teijin Limited, and a product available under the trade name "NRF" from Nitto Denko Corporation.

The first retardation layer 20 may be obtained by, for example, stretching a film formed from the polycarbonate-based resin. Any appropriate forming method may be adopted as a method of forming a film from the polycarbonate-based resin. Specific examples thereof include a compression molding method, a transfer molding method, an injection molding method, an extrusion method, a blowing method, a powder forming method, a FRP molding method, a cast coating method (such as a casting method), a calendar method, and a hot-press method. Of those, an extrusion method or a cast coating method is preferred. This is because the extrusion method or the cast coating method can increase the smoothness of the film to be obtained and provide satisfactory optical uniformity. Forming conditions may be appropriately set depending on, for example, the composition and kind of the resin to be used, and the desired characteristics of the retardation layer. As described above, for the polycarbonate-based resin, many film products are commercially available, and hence the commercially available films may each be subjected to stretching treatment.

The thickness of the resin film (unstretched film) may be set to any appropriate value depending on, for example, the desired thickness and desired optical characteristics of the first retardation layer, and stretching conditions to be described later. The thickness is preferably from 50 µm to 300 µm.

Any appropriate stretching method and stretching conditions (such as a stretching temperature, a stretching ratio, and a stretching direction) may be adopted for the stretching. Specifically, one kind of various stretching methods, such as free-end stretching, fixed-end stretching, free-end shrinkage, and fixed-end shrinkage, may be employed alone, or two or more kinds thereof may be employed simultaneously or sequentially. With regard to the stretching direction, the stretching may be performed in various directions or dimensions, such as a lengthwise direction, a widthwise direction, a thickness direction, and an oblique direction. When the glass transition temperature of the resin film is represented by Tg, the stretching temperature falls within a range of preferably from Tg−30° C. to Tg+60° C., more preferably from Tg−10° C. to Tg+50° C.

A retardation film having the desired optical characteristics (such as a refractive index characteristic, an in-plane retardation, and an Nz coefficient) can be obtained by appropriately selecting the stretching method and stretching conditions.

In one embodiment, the retardation film is produced by subjecting a resin film to uniaxial stretching or fixed-end uniaxial stretching. The fixed-end uniaxial stretching is specifically, for example, a method involving stretching the resin film in its widthwise direction (lateral direction) while running the film in its lengthwise direction. The stretching ratio is preferably from 1.1 times to 3.5 times.

In another embodiment, the retardation film may be produced by continuously subjecting a resin film having an elongate shape to oblique stretching in the direction of the angle θ with respect to a lengthwise direction. When the oblique stretching is adopted, a stretched film having an elongate shape and having an alignment angle which is the angle θ with respect to the lengthwise direction of the film (having a slow axis in the direction of the angle θ) is obtained, and for example, roll-to-roll operation can be performed in its lamination with the polarizer, with the result that the manufacturing process can be simplified. The angle θ may be an angle formed by the absorption axis of the polarizer and the slow axis of the retardation layer in the polarizing plate with a retardation layer. As described above, the angle θ is preferably from 38° to 52°, more preferably from 42° to 48°, still more preferably about 45°.

As a stretching machine to be used for the oblique stretching, for example, there is given a tenter stretching machine capable of applying feeding forces, or tensile forces or take-up forces, having different speeds on left and right sides in a lateral direction and/or a longitudinal direction. Examples of the tenter stretching machine include a lateral uniaxial stretching machine and a simultaneous biaxial stretching machine, and any appropriate stretching machine may be used as long as the resin film having an elongate shape can be continuously subjected to the oblique stretching.

Through appropriate control of each of the speeds on the left and right sides in the stretching machine, a retardation layer (substantially a retardation film having an elongate shape) having the desired in-plane retardation and having a slow axis in the desired direction can be obtained.

The stretching temperature of the film may be changed depending on, for example, the desired in-plane retardation value and thickness of the retardation layer, the kind of the resin to be used, the thickness of the film to be used, and a stretching ratio. Specifically, the stretching temperature is preferably from Tg−30° C. to Tg+30° C., more preferably from Tg−15° C. to Tg+15° C., most preferably from Tg−10° C. to Tg+10° C. When the stretching is performed at such temperature, a first retardation layer having characteristics which are appropriate in the present invention can be obtained. Tg refers to the glass transition temperature of the material constituting the film.

C-3. First Retardation Layer Constituted of Alignment Fixed Layer of Liquid Crystal Compound The first retardation layer 20 may be an alignment fixed layer of a liquid crystal compound. When the liquid crystal compound is used, the difference between nx and ny of the retardation layer to be obtained can be markedly increased as compared to a non-liquid crystal material, and hence the thickness of the retardation layer required for obtaining a desired in-plane retardation can be markedly reduced. As a result, further thinning of the polarizing plate with a retardation layer can be realized. When the first retardation layer 20 is constituted of the alignment fixed layer of a liquid crystal compound, the thickness of the first retardation layer 20 is preferably from 0.5 µm to 7 µm, more preferably from 1 µm to 5 µm. When the liquid crystal compound is used, an in-plane retardation comparable to that of the resin film can be realized with a markedly small thickness as compared to the resin film.

The term "alignment fixed layer" as used herein refers to a layer in which the liquid crystal compound is aligned in a predetermined direction and its alignment state is fixed. The "alignment fixed layer" is a concept encompassing an aligned cured layer obtained by curing a liquid crystal monomer as described later. In this embodiment, a rod-shaped liquid crystal compound is typically aligned in a state of being aligned in the slow axis direction of the first retardation layer (homogeneous alignment). An example of the liquid crystal compound is a liquid crystal compound whose liquid crystal phase is a nematic phase (nematic liquid crystal). As such liquid crystal compound, for example, a liquid crystal polymer or a liquid crystal monomer may be used. The expression mechanism of the liquid crystallinity of the liquid crystal compound may be lyotropic or thermotropic. The liquid crystal polymer and the liquid crystal monomer may each be used alone, or may be used in combination.

When the liquid crystal compound is the liquid crystal monomer, the liquid crystal monomer is preferably a polymerizable monomer or a cross-linkable monomer. This is because the alignment state of the liquid crystal monomer can be fixed by polymerizing or cross-linking (that is, curing) the liquid crystal monomer. After the alignment of the liquid crystal monomer, for example, when molecules of the liquid crystal monomer are polymerized or cross-linked with each other, the alignment state can be fixed as a result. In this case, a polymer is formed through the polymerization and a three-dimensional network structure is formed through the cross-linking, and the polymer and the structure are non-liquid crystalline. Therefore, the formed first retardation layer does not undergo, for example, a transition caused by a temperature change to a liquid crystal phase, a glass phase, or a crystal phase, which is peculiar to a liquid crystalline compound. As a result, the first retardation layer becomes a retardation layer which is extremely excellent in stability without being affected by a temperature change.

The temperature range in which the liquid crystal monomer shows liquid crystallinity varies depending on its kind. Specifically, the temperature range is preferably from 40° C. to 120° C., more preferably from 50° C. to 100° C., most preferably from 60° C. to 90° C.

Any appropriate liquid crystal monomer may be adopted as the liquid crystal monomer. For example, a polymerizable mesogenic compound and the like disclosed in Japanese Patent Translation Publication No. 2002-533742 (WO 00/37585), EP 358208 (U.S. Pat. No. 5,211,877), EP 66137 (U.S. Pat. No. 4,388,453), WO 93/22397, EP 0261712, DE 19504224, DE 4408171, GB 2280445, and the like may be used. Specific examples of such polymerizable mesogenic compound include a product available under the trade name LC242 from BASF SE, a product available under the trade name E7 from Merck KGaA, and a product available under the trade name LC-Sillicon-CC3767 from Wacker Chemie AG. The liquid crystal monomer is preferably, for example, a nematic liquid crystal monomer.

The alignment fixed layer of a liquid crystal compound may be formed by: subjecting the surface of a predetermined base material to alignment treatment; applying an application liquid containing a liquid crystal compound onto the surface; aligning the liquid crystal compound in a direction corresponding to the alignment treatment; and fixing the alignment state. In one embodiment, the base material is any appropriate resin film, and the alignment fixed layer formed on the base material may be transferred onto the surface of the polarizing plate 10. In another embodiment, the base material may be the second protective layer 13. In this case, the transfer step is omitted, lamination can be performed by a roll-to-roll process continuously from the formation of the alignment fixed layer (first retardation layer), and hence productivity is further improved.

As the alignment treatment, any appropriate alignment treatment may be adopted. Specific examples thereof include mechanical alignment treatment, physical alignment treatment, and chemical alignment treatment. Specific examples of the mechanical alignment treatment include rubbing treatment and stretching treatment. Specific examples of the physical alignment treatment include magnetic field alignment treatment and electric field alignment treatment. Specific examples of the chemical alignment treatment include an oblique deposition method and photoalignment treatment. Any appropriate conditions may be adopted as treatment conditions for the various alignment treatments depending on purposes.

The alignment of the liquid crystal compound is performed through treatment at a temperature at which the liquid crystal compound shows a liquid crystal phase depending on the kind of the liquid crystal compound. When the treatment at such temperature is performed, the liquid crystal compound adopts a liquid crystal state, and the liquid crystal compound is aligned depending on the alignment treatment direction of the surface of the base material.

In one embodiment, the fixation of the alignment state is performed by cooling the liquid crystal compound aligned as described above. When the liquid crystal compound is the polymerizable monomer or the cross-linkable monomer, the fixation of the alignment state is performed by subjecting the liquid crystal compound aligned as described above to polymerization treatment or cross-linking treatment.

Specific examples of the liquid crystal compound and details of the method of forming the alignment fixed layer are disclosed in Japanese Patent Application Laid-open No. 2006-163343. The disclosure of the laid-open publication is incorporated herein by reference.

In one embodiment, as illustrated in FIG. 3, the alignment fixed layer may have a laminated structure of the first alignment fixed layer 21 and the second alignment fixed layer 22. In this case, any one of the first alignment fixed layer 21 and the second alignment fixed layer 22 may function as a λ/4 plate, and the other may function as a λ/2 plate. Therefore, the thickness of each of the first alignment fixed layer 21 and the second alignment fixed layer 22 may be adjusted so that a desired in-plane retardation of the λ/4 plate or the λ/2 plate is obtained. For example, when the first alignment fixed layer 21 functions as the λ/4 plate and the second alignment fixed layer 22 functions as the λ/2 plate, the thickness of the first alignment fixed layer 21 is, for example, from 1 µm to 1.3 µm and the thickness of the second alignment fixed layer 22 is, for example, from 1.9 µm to 2.1 µm. The first alignment fixed layer 21 and the second alignment fixed layer 22 may be laminated so that their slow axes form an angle of, for example, from 50° to 70°, preferably about 60°. With such configuration, a characteristic close to an ideal reverse wavelength dispersion characteristic can be obtained, with the result that an extremely excellent antireflection characteristic can be realized.

D. Adhesive Layer

D-1. First Adhesive Layer and Second Adhesive Layer

Each of the first adhesive layer and the second adhesive layer may be constituted of any appropriate adhesive or pressure-sensitive adhesive as long as their average linear expansion coefficients satisfy the relationship described in the section A.

The adhesive preferably has transparency and optical isotropy. The adhesive may adopt any appropriate form. Specific examples thereof include an aqueous adhesive, a solvent-type adhesive, an emulsion-based adhesive, a solvent-free adhesive, an active energy ray-curable adhesive, and a heat-curable adhesive. Examples of the active energy ray-curable adhesive include an electron beam-curable adhesive, a UV-curable adhesive, and a visible light-curable adhesive. Of those, an aqueous adhesive and an active energy ray-curable adhesive may be suitably used.

Specific examples of the aqueous adhesive include an isocyanate-based adhesive, a polyvinyl alcohol-based adhesive, a gelatin-based adhesive, a vinyl latex-based adhesive, an aqueous polyurethane-based adhesive, and an aqueous polyester-based adhesive. Of those, a polyvinyl alcohol-based adhesive, such as polyvinyl alcohol or modified polyvinyl alcohol, is preferred, and an adhesive including, as a main component, polyvinyl alcohol having an acetoacetyl group is more preferred. Such adhesives are commercially available, and a specific example of the commercially available product is a product available under the trade name "Gohsefimer Z" from the Nippon Synthetic Chemical Industry Co. Ltd.

A specific example of the active energy ray-curable adhesive is a (meth)acrylate-based adhesive. (Meth)acrylate means acrylate and/or methacrylate. As a curable component in the (meth)acrylate-based adhesive, for example, there are given a compound having a (meth)acryloyl group, and a compound having a vinyl group. A preferred example of the compound having a (meth)acryloyl group is an N-substituted amide-based monomer represented by the following formula (1):

$$CH_2=C(R^1)-CONH_{2-m}-(X-O-R^2)_m \qquad (1)$$

where $R^1$ represents a hydrogen atom or a methyl group, X represents a $-CH_2-$ group or a $-CH_2CH_2-$ group, $R^2$ represents a $-(CH_2)_n-H$ group (where n represents 0, 1, or 2), and m represents 1 or 2.

The (meth)acrylate-based adhesive may further contain, as the curable component, a monomer having two or more carbon-carbon double bonds, preferably a polyfunctional (meth)acrylate-based monomer. The monomer having two or more carbon-carbon double bonds is more preferably hydrophobic. In addition, the (meth)acrylate-based adhesive may contain, as the curable component, any of monofunctional (meth)acrylates, urethane (meth)acrylates, polyester (meth)acrylates, and the like each having an aromatic ring and a hydroxy group.

The (meth)acrylate-based adhesive may contain any appropriate copolymerizable component.

Details of the aqueous adhesive and the active energy ray-curable adhesive are disclosed in paragraphs [0057] to [0089] of Japanese Patent Application Laid-open No. 2011-81359. The disclosure of the laid-open publication is incorporated herein by reference.

Another specific example of the active energy ray-curable adhesive is a photocationically curable adhesive mainly formed of an epoxy compound and a photoacid generator. Examples of the epoxy compound which may be used include compounds disclosed in paragraphs [0031] to [0085] of Japanese Patent Application Laid-open No. 2010-145537. In addition, examples of the photoacid generator include compounds disclosed in paragraphs [0080] to [0095] of Japanese Patent Application Laid-open No. 2009-013316. The disclosures of those laid-open publications are incorporated herein by reference.

The pressure-sensitive adhesive contains any appropriate pressure-sensitive adhesive polymer. From the viewpoint that a balance of pressure-sensitive adhesive performance is easily achieved, the pressure-sensitive adhesive polymer is preferably a polymer having a Tg of 0° C. or less (generally −100° C. or more). Of such polymers, a polyester-based polymer or a (meth)acrylic polymer is suitably used.

As the polyester-based polymer, a saturated polyester or copolyester of a polyhydric alcohol and a polyvalent carboxylic acid may be typically used. Examples of the polyhydric alcohol include diols, such as ethylene glycol, propylene glycol, hexamethylene glycol, neopentyl glycol, 1,2-cyclohexanedimethanol, 1,4-cyclohexanedimethanol, decamethylene glycol, 1,3-propanediol, 1,4-butanediol, 1,5-pentanediol, 1,6-hexanediol, 2,2-bis(4-hydroxyphenyl) propane, and bis(4-hydroxyphenyl) sulfone. Examples of the polyvalent carboxylic acid include: aromatic dicarboxylic acids, such as terephthalic acid, isophthalic acid, orthophthalic acid, 2,5-naphthalenedicarboxylic acid, 2,6-naphthalenedicarboxylic acid, 1,4-naphthalenedicarboxylic acid, 1,5-naphthalenedicarboxylic acid, diphenyldicarboxylic acid, diphenoxyethanedicarboxylic acid, diphenylsulfonecarboxylic acid, and anthracenedicarboxylic acid; alicyclic dicarboxylic acids, such as 1,3-cyclopentanedicarboxylic acid, 1,3-cyclohexanedicarboxylic acid, 1,4-cyclohexanedicarboxylic acid, hexahydroterephthalic acid, and hexahydroisophthalic acid; and aliphatic dicarboxylic acids, such as malonic acid, dimethylmalonic acid, succinic acid, 3,3-diethylsuccinic acid, glutaric acid, 2,2-dimethylglutaric acid, adipic acid, 2-methyladipic acid, trimethyladipic acid, pimelic acid, azelaic acid, dimer acid, sebacic acid, suberic acid, and dodecadicarboxylic acid. As the polyvalent carboxylic acid, a combination of two or more kinds of polyvalent carboxylic acids, for example, an aromatic dicarboxylic acid and an aliphatic dicarboxylic acid is often used.

The (meth)acrylic polymer generally contains, as a monomer unit, an alkyl (meth)acrylate as a main component. As the alkyl (meth)acrylate, which constitutes a main skeleton of the (meth)acrylic polymer, there may be given, for example, alkyl (meth)acrylates each having a linear or branched alkyl group having 1 to 18 carbon atoms. They may be used alone or in combination. Such alkyl groups preferably have 3 to 9 carbon atoms on average. In addition, an alkyl (meth)acrylate containing an aromatic ring, such as phenoxyethyl (meth)acrylate or benzyl (meth)acrylate, may be used. A polymer obtained by polymerizing the alkyl (meth)acrylate containing an aromatic ring may be used by being mixed with the (meth)acrylic polymer exemplified above, or the alkyl (meth)acrylate containing an aromatic ring may be used by being copolymerized with the alkyl (meth) acrylate. From the viewpoint of transparency, copolymerization is preferred.

For the purpose of improving an adhesive property or heat resistance, one or more kinds of copolymerizable monomers each having a polymerizable functional group (e.g., an unsaturated double bond-containing group, such as a (meth) acryloyl group or a vinyl group) may be introduced into the (meth)acrylic polymer through copolymerization.

Any appropriate copolymerizable monomer other than the above-mentioned copolymerizable monomers may be introduced into the (meth)acrylic polymer through copolymerization. The kind, number, copolymerization ratio, and the like of such copolymerizable monomers may be appropriately set depending on purposes.

The (meth)acrylic polymer may be any one of a random copolymer, a block copolymer, and a graft copolymer.

The pressure-sensitive adhesive may contain a cross-linking agent. As the cross-linking agent, an organic cross-linking agent or a polyfunctional metal chelate may be used. Examples of the organic cross-linking agent include an isocyanate-based cross-linking agent, a peroxide-based cross-linking agent, an epoxy-based cross-linking agent, and an imine-based cross-linking agent. The polyfunctional metal chelate is an organic compound having a polyvalent metal atom covalently bonded or coordinately bonded thereto. Examples of the polyvalent metal atom include Al, Cr, Zr, Co, Cu, Fe, Ni, V, Zn, In, Ca, Mg, Mn, Y, Ce, Sr, Ba, Mo, La, Sn, and Ti. As an atom in the organic compound to which the polyvalent metal atom is covalently bonded or coordinately bonded, there is given, for example, an oxygen atom, and examples of the organic compound include an alkyl ester, an alcohol compound, a carboxylic acid compound, an ether compound, and a ketone compound. Preferred examples of the cross-linking agent include an isocyanate-based cross-linking agent and a peroxide-type cross-linking agent.

Examples of the isocyanate-based cross-linking agent include an isocyanate monomer, such as tolylene diisocyanate, chlorophenylene diisocyanate, tetramethylene diisocyanate, xylylene diisocyanate, diphenylmethane diisocyanate, or hydrogenated diphenylmethane diisocyanate, and an isocyanate compound obtained by adding such isocyanate monomer to trimethylolpropane, an isocyanurate compound, and a biuret-type compound, and a urethane prepolymer-type isocyanate obtained through an addition reaction with polyether polyol, polyester polyol, acrylic polyol, polybutadiene polyol, or polyisoprene polyol.

As the peroxide-type cross-linking agent, any appropriate peroxide-type cross-linking agent may be used as long as the peroxide-type cross-linking agent generates a radically active species through heating or photoirradiation to promote the cross-linking of the base polymer of the pressure-sensitive adhesive. In consideration of workability and stability, the one-minute half-life temperature of the peroxide-type cross-linking agent is preferably from 80° C. to 160° C., more preferably from 90° C. to 140° C. As specific examples of a peroxide which may be used as the cross-linking agent, there are given di(2-ethylhexyl) peroxydicarbonate (one-minute half-life temperature: 90.6° C.), di(4-t-butylcyclohexyl) peroxydicarbonate (one-minute half-life temperature: 92.1° C.), di-sec-butyl peroxydicarbonate (one-minute half-life temperature: 92.4° C.), t-butyl peroxyneodecanoate (one-minute half-life temperature: 103.5° C.), t-hexylperoxypivalate (one-minute half-life temperature: 109.1° C.), t-butyl peroxypivalate (one-minute half-life temperature: 110.3° C.), dilauroyl peroxide (one-minute half-life temperature: 116.4° C.), di-n-octanoyl peroxide (one-minute half-life temperature: 117.4° C.), 1,1,3,3-tetramethylbutyl peroxy-2-ethylhexanoate (one-minute half-life temperature: 124.3° C.), di(4-methylbenzoyl) peroxide (one-minute half-life temperature: 128.2° C.), dibenzoyl peroxide (one-minute half-life temperature: 130.0° C.), t-butyl peroxyisobutylate (one-minute half-life temperature: 136.1° C.), and 1,1-di(t-hexylperoxy)cyclohexane (one-minute half-life temperature: 149.2° C.).

The pressure-sensitive adhesive may be blended with a silane coupling agent serving as an additive. Examples of the silane coupling agent include: silicon compounds each having an epoxy structure, such as 3-glycidoxypropyltrimethoxysilane, 3-glycidoxypropylmethyldimethoxysilane, and 2-(3,4-epoxycyclohexyl)ethyltrimethoxysilane; silicon compounds each having an amino group, such as 3-aminopropyltrimethoxysilane, N-(2-aminoethyl)-3-aminopropyltrimethoxysilane, and N-(2-aminoethyl)-3-aminopropylmethyldimethoxysilane; 3-chloropropyltrimethoxysilane; silane coupling agents each having a (meth)acrylic group, such as trimethoxysilane having an acetoacetyl group, 3-acryloxypropyltrimethoxysilane, and 3-methacryloxypropyltriethoxysilane; and silane coupling agents each having an isocyanate group, such as 3-isocyanatopropyltriethoxysilane.

Details of the pressure-sensitive adhesive are disclosed in paragraphs [0023] to [0080] of Japanese Patent Application Laid-open No. 2012-247517. The disclosure of the laid-open publication is incorporated herein by reference.

Through the adjustment of, for example, the kinds, number, and copolymerization ratio of the monomer components of the adhesive and the pressure-sensitive adhesive, the kind of the cross-linking agent, and the kinds, number, and blending amounts of the additives, an adhesive and a pressure-sensitive adhesive each having a desired linear expansion coefficient can be obtained. Thus, a first adhesive layer and a second adhesive layer having a desired linear expansion coefficient relationship can be formed.

The thickness of the first adhesive layer 30 is preferably from 0.05 μm to 30 μm, more preferably from 0.5 μm to 20 μm. The thickness of the second adhesive layer 40 is preferably from 10 μm to 30 μm, more preferably from 12 μm to 20 μm.

D-2. Other Adhesive Layer

Any other adhesive layer (not shown) to be used for the lamination of the constituent layers of the polarizing plate with a retardation layer of the present invention may be constituted of any appropriate adhesive or pressure-sensitive adhesive. It is preferred that the average linear expansion coefficient of the other adhesive layer be smaller than the average linear expansion coefficient of the second adhesive layer.

E. Second Retardation Layer

The second retardation layer 50 may have any appropriate optical characteristics depending on purposes. In one embodiment, the second retardation layer may be a so-called positive C plate, which has a refractive index characteristic of showing a relationship of nz>nx=ny. When the positive C plate is used as the second retardation layer, reflection in an oblique direction can be satisfactorily prevented, and an antireflection function can be exhibited over a wide viewing angle. In this case, the thickness direction retardation Rth (550) of the second retardation layer is preferably from −50 nm to −300 nm, more preferably from −70 nm to −250 nm, still more preferably from −90 nm to −200 nm, particularly preferably from −100 nm to −180 nm. Herein, "nx=ny" encompasses not only the case where nx and ny are exactly equal to each other, but also the case where nx and ny are substantially equal to each other. That is, the in-plane retardation Re(550) of the second retardation layer may be less than 10 nm.

The second retardation layer having a refractive index characteristic of nz>nx=ny may be formed of any appropriate material. The second retardation layer is preferably formed of a film containing a liquid crystal material fixed in homeotropic alignment. The liquid crystal material (liquid crystal compound) which can be homeotropically aligned may be a liquid crystal monomer, or may be a liquid crystal polymer. Specific examples of the liquid crystal compound and a method of forming the retardation layer include liquid crystal compounds disclosed in paragraphs [0020] to [0028] of Japanese Patent Application Laid-open No. 2002-333642 and a method of forming the retardation layer disclosed therein. In this case, the thickness of the second retardation layer is preferably from 0.5 μm to 10 μm, more preferably from 0.5 μm to 8 μm, still more preferably from 0.5 μm to 5 μm.

F. Conductive Layer or Isotropic Base Material with a Conductive Layer

The conductive layer may be formed by forming a metallic oxide film on any appropriate base material through any appropriate film forming method (e.g., a vacuum vapor deposition method, a sputtering method, a CVD method, an ion plating method, and a spraying method). Examples of the metal oxide include indium oxide, tin oxide, zinc oxide, indium-tin composite oxide, tin-antimony composite oxide, zinc-aluminum composite oxide, and indium-zinc composite oxide. Of those, indium-tin composite oxide (ITO) is preferred.

When the conductive layer contains the metal oxide, the thickness of the conductive layer is preferably 50 nm or less, more preferably 35 nm or less. The lower limit of the thickness of the conductive layer is preferably 10 nm.

The conductive layer may be transferred from the base material onto the first retardation layer (or, if present, the second retardation layer) to serve alone as a constituent layer of the polarizing plate with a retardation layer, or may be laminated, as a laminate with the base material (base material with a conductive layer), on the first retardation layer (or, if present, the second retardation layer). It is preferred that the base material be optically isotropic, and hence the conductive layer may be used, as an isotropic base material with a conductive layer, for the polarizing plate with a retardation layer.

As the optically isotropic base material (isotropic base material), any appropriate isotropic base material may be adopted. As a material constituting the isotropic base material, for example, there are given a material containing, as a main skeleton, a resin having no conjugated system, such as a norbornene-based resin or an olefin-based resin, and a material having a cyclic structure, such as a lactone ring or a glutarimide ring, in a main chain of an acrylic resin. The use of such material can suppress and reduce the expression of a retardation caused by the alignment of molecular chains when the isotropic base material is formed. The thickness of the isotropic base material is preferably 50 μm or less, more preferably 35 μm or less. The lower limit of the thickness of the isotropic base material is, for example, 20 μm.

The conductive layer and/or the conductive layer of the isotropic base material with a conductive layer may be patterned as required. Through the patterning, a conductive part and an insulating part may be formed. As a result, an electrode may be formed. The electrode may function as a touch sensor electrode configured to detect contact on a touch panel. Any appropriate method may be adopted as a patterning method. Specific examples of the patterning method include a wet etching method and a screen printing method.

G. Others

A polarizing plate with a retardation layer according to an embodiment of the present invention may further include another retardation layer. The optical characteristics (such as refractive index characteristics, in-plane retardation, Nz coefficient, and photoelastic coefficient), thickness, arrangement position, and the like of the other retardation layer may be appropriately set depending on purposes.

In practical use, it is preferred that the surface of the second adhesive layer 40 have bonded thereonto a release film until the polarizing plate with a retardation layer is used.

H. Image Display Apparatus

The polarizing plate with a retardation layer described in the section A to the section G may be applied to an image display apparatus. Therefore, the present invention encompasses an image display apparatus using such polarizing plate with a retardation layer. Typical examples of the image display apparatus include a liquid crystal display apparatus and an organic EL display apparatus. An image display apparatus according to an embodiment of the present invention includes, on its viewer side, the polarizing plate with a retardation layer described in the section A to the section G. The polarizing plate with a retardation layer is laminated so that the retardation layer is arranged on a display cell (e.g., liquid crystal cell or organic EL cell) side (so that the polarizer is arranged on the viewer side).

Now, the present invention is specifically described by way of Examples. However, the present invention is not limited by these Examples. Measurement methods for characteristics are as described below.

(1) Thickness

For a retardation layer formed by application (alignment fixed layer of a liquid crystal compound), measurement was performed by an interference thickness measurement method with MCPD2000 manufactured by Otsuka Electronics Co., Ltd. For any other film, measurement was performed with a digital micrometer (KC-351C manufactured by Anritsu Corporation).

(2) Average Linear Expansion Coefficient

Through the use of TMA manufactured by SII NanoTechnology Inc. (SS7100), a solution for forming adhesive layer used in each of Examples and Comparative Examples was formed into a film having a thickness of about 100 μm, the film was cut into an about 6 mm square and placed on a sample stage, and TMA (compression/expansion method) measurement was performed in conformity to JIS K 7197. The measurement was performed in the range of from −150° C. to 20° C. under the conditions of a measurement load of 19.6 mN, a probe diameter of 3.5 mmφ, and a rate of temperature increase of 5° C./min, and an average linear expansion coefficient in that range was calculated on the basis of the resultant data on dimensional changes.

(3) Retardation Value of Retardation Layer

The refractive indices nx, ny, and nz of a retardation layer used in each of Examples and Comparative Examples were measured with an automatic birefringence measuring apparatus (manufactured by Oji Scientific Instruments Co., Ltd., Automatic Birefringence Analyzer KOBRA-WPR). The measurement wavelength for an in-plane retardation Re was 450 nm and 550 nm, the measurement wavelength for a thickness direction retardation Rth was 550 nm, and the measurement temperature was 23° C.

(4) Reworkability

A smartphone manufactured by Samsung Electronics Co., Ltd. (Galaxy-S5) was disassembled to take out its organic EL panel. Then, a polarizing plate with a retardation layer obtained in each of Examples and Comparative Examples was cut to match the size of the panel and bonded thereonto. The panel having bonded thereonto the polarizing plate with a retardation layer was immersed in liquid nitrogen for 30 seconds, and then removed therefrom to find out whether or not the polarizing plate with a retardation layer was peeled off. For each of Examples and Comparative Examples, 20 panels each having bonded thereonto the polarizing plate with a retardation layer were produced and evaluation was performed. The evaluation was performed in accordance with the following criteria.

Satisfactory: The polarizing plate with a retardation layer is satisfactorily peeled off for all the 20 panels.

Unsatisfactory: The polarizing plate with a retardation layer is not peeled off for at least one of the panels.

Reference Example 1

Production of Polarizing Plate

An elongate roll of a polyvinyl alcohol (PVA)-based resin film having a thickness of 30 μm (manufactured by Kuraray Co., Ltd., product name: "PE3000") was uniaxially stretched in an elongate direction with a roll stretching machine at a ratio of 5.9 times, and at the same time, was subjected to swelling, dyeing, cross-linking, and washing treatments, followed finally by drying treatment. Thus, a polarizer 1 having a thickness of 12 μm was produced.

Specifically, in the swelling treatment, the film was stretched at a ratio of 2.2 times while being treated with pure water at 20° C. Then, in the dyeing treatment, the film was stretched at a ratio of 1.4 times while being treated in an aqueous solution at 30° C. containing iodine and potassium iodide at a weight ratio of 1:7, whose iodine concentration had been adjusted so that the polarizer to be obtained had a single axis transmittance of 45.0%. Further, two-stage cross-linking treatment was adopted for the cross-linking treatment. In the first-stage cross-linking treatment, the film was stretched at a ratio of 1.2 times while being treated in an aqueous solution at 40° C. having dissolved therein boric acid and potassium iodide. The boric acid content and potassium iodide content of the aqueous solution of the first-stage cross-linking treatment were set to 5.0 wt % and 3.0 wt %, respectively. In the second-stage cross-linking treatment, the film was stretched at a ratio of 1.6 times while being treated in an aqueous solution at 65° C. having dissolved therein boric acid and potassium iodide. The boric acid content and potassium iodide content of the aqueous solution of the second-stage cross-linking treatment were set to 4.3 wt % and 5.0 wt %, respectively. In addition, in the washing treatment, the film was treated in a potassium iodide aqueous solution at 20° C. The potassium iodide content of the aqueous solution of the washing treatment was set to 2.6 wt %. Finally, in the drying treatment, the film was dried at 70° C. for 5 minutes. Thus, the polarizer 1 was obtained.

Onto both surfaces of the resultant polarizer 1, through the intermediation of a polyvinyl alcohol-based adhesive, a TAC film manufactured by Konica Minolta, Inc. (product name: KC2UA, thickness: 25 μm, corresponding to the second protective layer) and a HC-TAC film having a hard coat (HC) layer formed on one surface of the TAC film by hard coat treatment (thickness: 32 μm, corresponding to the first protective layer) were bonded, respectively. Thus, a polarizing plate 1 having a configuration of "first protective layer/polarizer 1/second protective layer" was obtained.

Reference Example 2

Production of Retardation Film Constituting Retardation Layer 2-1. Production of Polycarbonate Resin Film 26.2 Parts by mass of isosorbide (ISB), 100.5 parts by mass of 9,9-[4-(2-hydroxyethoxy)phenyl]fluorene (BHEPF), 10.7 parts by mass of 1,4-cyclohexanedimethanol (1,4-CHDM), 105.1 parts by mass of diphenyl carbonate (DPC), and 0.591 part by mass of cesium carbonate (0.2 mass % aqueous solution) serving as a catalyst were loaded into a reaction vessel. Under a nitrogen atmosphere, as a first step of a reaction, the heating medium temperature of the reaction vessel was set to 150° C. and the raw materials were dissolved while being stirred as required (about 15 minutes).

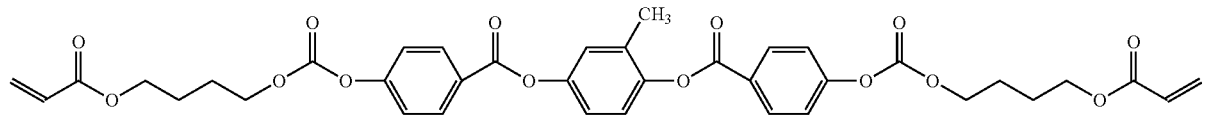 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

Then, the pressure in the reaction vessel was changed from normal pressure to 13.3 kPa, and while the heating medium temperature of the reaction vessel was increased to 190° C. in 1 hour, generated phenol was taken out of the reaction vessel.

The temperature in the reaction vessel was kept at 190° C. for 15 minutes. After that, as a second step, the pressure in the reaction vessel was set to 6.67 kPa, the heating medium temperature of the reaction vessel was increased to 230° C. in 15 minutes, and generated phenol was taken out of the reaction vessel. As the stirring torque of the stirrer increased, the temperature was increased to 250° C. in 8 minutes, and in order to remove generated phenol, the pressure in the reaction vessel was reduced to 0.200 kPa or less. After the stirring torque reached a predetermined value, the reaction was terminated, and the produced reaction product was taken out into water and then pelletized to provide a polycarbonate resin having the following composition: BHEPF/ISB/1,4-CHDM=47.4 mol %/37.1 mol %/15.5 mol %.

The thus-obtained polycarbonate resin had a glass transition temperature of 136.6° C. and a reduced viscosity of 0.395 dL/g.

The thus-obtained polycarbonate resin was vacuum-dried at 80° C. for 5 hours, and then a polycarbonate resin film having a thickness of 120 μm was produced using a film-forming apparatus provided with a single-screw extruder (manufactured by Isuzu Kakoki, screw diameter: 25 mm, cylinder preset temperature: 220° C.), a T-die (width: 200 mm, preset temperature: 220° C.), a chill roll (preset temperature: 120° C. to 130° C.), and a take-up unit.

2-2. Production of Retardation Film

The thus-obtained polycarbonate resin film was laterally stretched using a tenter stretching machine to provide a retardation film having a thickness of 50 μm. In this case, the stretching ratio was 250%, and the stretching temperature was set to from 137° C. to 139° C.

The thus-obtained retardation film had an Re(550) of from 137 nm to 147 nm, an Re(450)/Re(550) of 0.89, an Nz coefficient of 1.21, and an alignment angle (direction of a slow axis) of 90° with respect to an elongate direction. The retardation film was used as a retardation layer 1.

Reference Example 3

Production of Liquid Crystal Alignment Fixed Layer Constituting Retardation Layer 10 g of a polymerizable liquid crystal showing a nematic liquid crystal phase (manufactured by BASF SE: trade name: "Paliocolor LC242", represented by the formula as indicated below), and 3 g of a photopolymerization initiator for the polymerizable liquid crystal compound (manufactured by BASF SE: trade name: "IRGACURE 907") were dissolved in 40 g of toluene to prepare a liquid crystal composition (application liquid).

The surface of a polyethylene terephthalate (PET) film (thickness: 38 μm) was subjected to alignment treatment by rubbing with a rubbing cloth. The alignment treatment was performed under the conditions as indicated below: the number of times of rubbing (number of rubbing rolls) was 1, the radius r of the rubbing roll was 76.89 mm, the number of rotations nr of the rubbing roll was 1,500 rpm, the film conveyance speed v was 83 mm/sec, and the rubbing strength RS and the pushing depth M were set to five kinds of conditions (a) to (e) as shown in Table 1.

TABLE 1

| | Rubbing strength RS (mm) | Pushing depth M (mm) |
|---|---|---|
| Condition (a) | 2,618 | 0.3 |
| Condition (b) | 3,491 | 0.4 |
| Condition (c) | 4,363 | 0.5 |
| Condition (d) | 1,745 | 0.2 |
| Condition (e) | 873 | 0.1 |

The direction of the alignment treatment was set so as to be a direction of −75° with respect to the direction of the absorption axis of the polarizer as seen from a viewer side in bonding onto the polarizing plate. Onto the alignment-treated surface, the liquid crystal application liquid was applied with a bar coater, and was dried by heating at 90° C. for 2 minutes to align the liquid crystal compound. Under the conditions (a) to (c), the alignment state of the liquid crystal compound was extremely satisfactory. Under the conditions (d) and (e), a slight disturbance occurred in the alignment of the liquid crystal compound, but was at such a level as not to cause any problem in practical use. The thus-formed liquid crystal layer was irradiated with 1 mJ/cm² of light through the use of a metal halide lamp to cure the liquid crystal layer. Thus, a retardation layer (liquid crystal alignment fixed layer) 2 was formed on the PET film. The retardation layer 2 had a thickness of 2 μm and an in-plane retardation Re(550) of 270 nm. Further, the retardation layer 2 had a refractive index characteristics of nx>ny=nz.

Reference Example 4

Production of Liquid Crystal Alignment Fixed Layer Constituting Retardation Layer The surface of a polyethylene terephthalate (PET) film (thickness: 38 μm) was subjected to alignment treatment by rubbing with a rubbing cloth. The direction of the alignment treatment was set so as to be a direction of −15° with respect to the direction of the absorption axis of the polarizer as seen from a viewer side in bonding onto the polarizing plate. Onto the alignment-treated surface, the same liquid crystal application liquid as that of Reference Example 3 was applied, and the liquid crystal compound was aligned and cured in the same manner as in Reference Example 3 to form a retardation layer 3 on the PET film. The retardation layer 3 had a thickness of 1.2 μm and an in-plane retardation Re (550) of 140 nm. Further, the retardation layer 3 had a refractive index characteristics of nx>ny=nz.

Reference Example 5

Production of Adhesive Layer

Into a reaction vessel equipped with a cooling tube, a nitrogen inlet tube, a thermometer, and a stirring device, 99 parts of butyl acrylate, 1.0 part of 4-hydroxybutyl acrylate, and 0.3 part of 2,2'-azobisisobutyronitrile were added together with ethyl acetate. The mixture in the reaction vessel was allowed to react at 60° C. for 4 hours under a stream of nitrogen gas, and then ethyl acetate was added to the reaction solution to provide a solution (solid content: 30%) containing an acrylic polymer having a weight-average molecular weight of 1,650,000. Per 100 parts of the solid content of the acrylic polymer solution, 0.15 part of dibenzoyl peroxide (manufactured by Nippon Oil & Fats Co., Ltd.: NYPER BO-Y), 0.1 part of trimethylolpropane xylene diisocyanate (manufactured by Mitsui Takeda Chemicals Inc.: TAKENATE D110N), and 0.2 part of a silane coupling agent (manufactured by Soken Chemical & Engineering Co., Ltd.: A-100, acetoacetyl group-containing silane coupling agent) were blended to provide a solution for forming adhesive layer. The solution for forming adhesive layer was applied onto a separator formed of a polyester film subjected to surface treatment with a silicone-based release agent, and was subjected to heating treatment at 155° C. for 3 minutes to provide an adhesive layer A having a thickness of 15 μm.

Reference Example 6

Production of Adhesive Layer

A four-necked flask equipped with a stirring blade, a thermometer, a nitrogen gas inlet tube, and a condenser was loaded with a monomer mixture containing 99 parts of butyl acrylate and 1 part of 4-hydroxybutyl acrylate. Further, with respect to 100 parts of the monomer mixture (solid content), 0.1 part of 2,2'-azobisisobutyronitrile serving as a polymerization initiator was added together with ethyl acetate, and while the mixture was slowly stirred, a nitrogen gas was introduced to perform nitrogen purging. After that, a polymerization reaction was performed for 7 hours while the liquid temperature in the flask was kept around 60° C. After that, to the resultant reaction solution, ethyl acetate was added to prepare a solution (solid content: 30%) of an acrylic polymer having a weight-average molecular weight of 1,400,000. With respect to 100 parts of the solid content of the resultant acrylic polymer solution, 0.2 part of trimethylpropylammonium bis(trifluoromethanesulfonyl)imide (manufactured by Tokyo Chemical Industry Co., Ltd.) was blended, and 0.1 part of trimethylolpropane xylylene diisocyanate (manufactured by Mitsui Chemicals, Inc.: TAKENATE D110N), 0.3 part of dibenzoyl peroxide, and 0.075 part of γ-glycidoxypropylmethoxysilane (manufactured by Shin-Etsu Chemical Co., Ltd.: KBM-403) were further blended to prepare a solution for forming adhesive layer. Then, the solution for forming adhesive layer was uniformly applied with a fountain coater onto the surface of a polyethylene terephthalate film (separator film) treated with a silicone-based release agent, and was dried in an air circulating thermostat oven at 155° C. for 2 minutes to form an adhesive layer B having a thickness of 15 μm on the surface of the separator film.

Reference Example 7

Production of Adhesive Layer

Into a reaction vessel equipped with a cooling tube, a nitrogen inlet tube, a thermometer, and a stirring device, 94.9 parts of butyl acrylate, 5 parts of acrylic acid, 0.1 part of 2-hydroxyethyl acrylate, and 0.3 part of benzoyl peroxide with respect to 100 parts of those monomers (solid content) were added together with ethyl acetate. The mixture in the reaction vessel was allowed to react at 60° C. for 7 hours under a stream of nitrogen gas, and then ethyl acetate was added to the reaction solution to provide a solution (solid content: 30 wt %) containing an acrylic polymer having a weight-average molecular weight of 2,200,000. Per 100 parts of the solid content of the acrylic polymer solution, 0.6 part of trimethylolpropane tolylene diisocyanate (manufactured by Nippon Polyurethane Industry Co., Ltd.: CORONATE L) and 0.075 part of γ-glycidoxypropylmethoxysilane (manufactured by Shin-Etsu Chemical Co., Ltd.: KBM-403) were blended to provide a solution for forming adhesive layer. The solution for forming adhesive layer was applied onto a separator formed of a polyester film subjected to surface treatment with a silicone-based release agent, and was subjected to heating treatment at 155° C. for 3 minutes to provide an adhesive layer C having a thickness of 15 μm.

Reference Example 8

Production of Adhesive Constituting Adhesive Layer

10 Parts of hydroxyethylacrylamide (manufactured by Kohjin Co., Ltd., log P=−0.56, Tg of homopolymer=123° C.) and 10 parts of tetrahydrofurfuryl (meth)acrylate (manufactured by Hitachi Chemical Company, Ltd., log P=1.13, Tg of homopolymer=45° C.) serving as monofunctional radically polymerizable compounds, 80 parts of tricyclodecanedimethanol diacrylate (manufactured by Kyoeisha Chemical Co., Ltd., "LIGHT ACRYLATE DCP-A", log P=3.05, Tg of homopolymer=134° C.) serving as a difunctional radically polymerizable compound, and 3 parts of IRGACURE 907 (trade name, manufactured by BASF SE) and 3 parts of KAYACURE DETX-S (trade name, manufactured by Nippon Kayaku Co., Ltd.) serving as radically polymerization initiators were mixed and stirred at 50° C. for 1 hour to provide an active energy ray-curable adhesive (adhesive for forming an adhesive layer D).

Example 1

The second protective layer surface of the polarizing plate 1 and the retardation layer 1 were bonded through the intermediation of the adhesive layer B so that the absorption axis of the polarizer and the slow axis of the retardation layer formed an angle of 45°, to thereby obtain a polarizing plate with a retardation layer. The adhesive layer A was bonded as an outermost layer onto the retardation layer surface of the resultant polarizing plate with a retardation layer to produce a polarizing plate 1 with a retardation layer. The resultant polarizing plate 1 with a retardation layer was subjected to the evaluation of reworkability in accordance with the above item (4). As a result, for all of the 20 produced panels, the polarizing plate 1 with a retardation layer was satisfactorily peeled off. The result is shown in Table 2.

Example 2

A polarizing plate 2 with a retardation layer was obtained in the same manner as in Example 1 except that the adhesive layer C was used for the bonding of the polarizing plate 1 and the retardation layer 1, and the adhesive layer B was used as the outermost layer. The resultant polarizing plate 2 with a retardation layer was subjected to the evaluation of reworkability in accordance with the above item (4). The result is shown in Table 2.

Comparative Example 1

A polarizing plate 3 with a retardation layer was obtained in the same manner as in Example 1 except that the adhesive layer B was used for the bonding of the polarizing plate 1 and the retardation layer 1, and the adhesive layer C was used as the outermost layer. The resultant polarizing plate 3 with a retardation layer was subjected to the evaluation of reworkability in accordance with the above item (4). The result is shown in Table 2.

Comparative Example 2

A cycloolefin-based retardation film A (manufactured by Kaneka Corporation, product name: "KUZ-Film #270", thickness: 33 μm, Re(550)=270 nm, Re(450)/Re(550)=1.00, Nz coefficient=1.00) and a cycloolefin-based retardation film B (manufactured by Kaneka Corporation, product name: "KUZ-Film #140", thickness: 28 μm, Re(550)=140 nm, Re(450)/Re(550)=1.00, Nz coefficient=1.00) were bonded through the intermediation of an acrylic adhesive layer having a thickness of 5 μm so that their slow axes formed an angle of 60°, to thereby produce a retardation layer 4.

The second protective layer surface of the polarizing plate 1 and the retardation layer 4 were bonded through the intermediation of the adhesive layer B so that the absorption axis of the polarizer and the slow axis of the retardation film A formed an angle of 15° and the absorption axis of the polarizer and the slow axis of the retardation film B formed an angle of 75°, to thereby provide a polarizing plate with a retardation layer. The adhesive layer C was bonded as an outermost layer onto the retardation layer surface of the resultant polarizing plate with a retardation layer to produce a polarizing plate 4 with a retardation layer. The resultant polarizing plate 4 with a retardation layer was subjected to the evaluation of reworkability in accordance with the above item (4). The result is shown in Table 2.

Example 3

A polarizing plate 5 with a retardation layer was obtained in the same manner as in Example 1 except that the second protective layer surface of the polarizing plate 1 and the retardation layer 2 were bonded through the intermediation of the active energy ray-curable adhesive (adhesive layer D) obtained in Reference Example 8, and two retardation layers, i.e., the retardation layer 2 and the retardation layer 3 were used. A specific procedure was as follows. The active energy ray-curable adhesive was applied onto the retardation layer 2 of a laminate of a PET film and the retardation layer 2 so as to have a thickness of about 1.0 μm after curing, and then the resultant was bonded onto the polarizing plate 1 using a roll bonding machine. After that, the resultant was heated to 50° C. using an IR heater from the retardation layer 2 side, and was irradiated with visible light (gallium-doped metal halide lamp) serving as an active energy ray from the retardation layer 2 side to cure the adhesive. As a result, the absorption axis of the polarizer and the slow axis of the retardation layer 2 formed an angle of 15°. "Light Hammer 10" manufactured by Fusion UV Systems, Inc. was used as an active energy ray irradiation apparatus, and a V bulb was used as a bulb. The peak irradiance was 1, 600 mW/cm$^2$, and the cumulative dose was 1,000 mJ/cm$^2$ (wavelength: 380 nm to 440 nm). The irradiance of the visible light was measured using Sola-Check System manufactured by Solatell Ltd. Then, the PET film was peeled off, and the retardation layer 3 was bonded onto the peeled surface in the same manner as the retardation layer 2 was. As a result, the absorption axis of the polarizer and the slow axis of the retardation layer 3 formed an angle of 75°. Further, the PET film on which the retardation layer 3 had been formed was peeled off to provide a polarizing plate with a retardation layer having a configuration of "polarizing plate/retardation layer 2/retardation layer 3." The adhesive layer A was bonded as an outermost layer onto the retardation layer 3 surface of the resultant polarizing plate with a retardation layer to produce a polarizing plate 5 with a retardation layer.

The resultant polarizing plate 5 with a retardation layer was subjected to the evaluation of reworkability in accordance with the above item (4). The result is shown in Table 2.

Comparative Example 3

A polarizing plate 6 with a retardation layer was obtained in the same manner as in Example 1 except that the adhesive layer A was used for the bonding of the polarizing plate 1 and the retardation layer 1. The resultant polarizing plate 6 with a retardation layer was subjected to the evaluation of reworkability in accordance with the above item (4). The result is shown in Table

TABLE 2

| | Total thickness (μm) | First adhesive layer (average linear expansion coefficient) | Second adhesive layer = outermost layer (average linear expansion coefficient) | Reworkability |
|---|---|---|---|---|
| Example 1 | 131 | B (39.1) | A (41.1) | Satisfactory (20/20) |
| Example 2 | 131 | C (35.8) | B (39.1) | Satisfactory (20/20) |
| Comparative Example 1 | 131 | B (39.1) | C (35.8) | Unsatisfactory (18/20) |
| Comparative Example 2 | 147 | B (39.1) | C (35.8) | Unsatisfactory (18/20) |
| Example 3 | 74 | D (4.9) | A (41.1) | Satisfactory (20/20) |
| Comparative Example 3 | 131 | A (41.1) | A (41.1) | Unsatisfactory (19/20) |

*Each average linear expansion coefficient is expressed in the unit of $10^{-5}/°C$.

<Evaluation>

As is apparent from Table 2, the polarizing plate with a retardation layer of each of Examples of the present invention is found to be excellent in reworkability at low temperature with liquid nitrogen. In the case of the polarizing plate with a retardation layer of Comparative Example 1, when an attempt was made to manually peel off a film for which rework was unable to be performed at low temperature (retardation layer remaining without being peeled from the display cell), the film broke and rework was unable to be performed. Meanwhile, the polarizing plate with a retardation layer of Comparative Example 2 was able to be manually peeled off without the breakage of a film for which rework was unable to be performed at low temperature.

The polarizing plate with a retardation layer of the present invention is suitably used in an image display apparatus, such as a liquid crystal display apparatus or an organic EL display apparatus.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A polarizing plate with a retardation layer, comprising:
   a polarizing plate including a polarizer and a protective layer on at least one side of the polarizer;
   a retardation layer;
   a first adhesive layer configured to bond the polarizing plate and the retardation layer; and
   a second adhesive layer arranged as an outermost layer on an opposite side of the retardation layer to the polarizing plate,
   wherein an average linear expansion coefficient of the second adhesive layer when an ambient temperature is changed from −150° C. to 20° C. is 38.0($\times 10^{-5}/°$ C.) or more, and is larger than an average linear expansion coefficient of the first adhesive layer when an ambient temperature is changed from −150° C. to 20° C.

2. The polarizing plate with a retardation layer according to claim 1, wherein the polarizing plate with a retardation layer has a total thickness of layers except for the second adhesive layer of 140 μm or less.

3. The polarizing plate with a retardation layer according to claim 1, wherein the retardation layer comprises a polycarbonate-based resin film.

4. The polarizing plate with a retardation layer according to claim 3, further comprising another retardation layer on an outside of the retardation layer.

5. The polarizing plate with a retardation layer according to claim 1, wherein the retardation layer comprises an alignment fixed layer of a liquid crystal compound.

6. The polarizing plate with a retardation layer according to claim 5, wherein the retardation layer has a laminated structure of: a first alignment fixed layer of a liquid crystal compound; and a second alignment fixed layer of a liquid crystal compound.

7. The polarizing plate with a retardation layer according to claim 1, further comprising one of a conductive layer and an isotropic base material with a conductive layer on an outside of the retardation layer.

8. An image display apparatus, comprising the polarizing plate with a retardation layer of claim 1.

* * * * *